United States Patent [19]
David

[11] 3,720,246
[45] March 13, 1973

[54] METHOD AND APPARATUS FOR HANDLING TREES
[75] Inventor: Emil J. David, Woodstock, Ontario, Canada
[73] Assignee: Eaton Yale & Towne Canada Limited, London, Ontario, Canada
[22] Filed: May 3, 1971
[21] Appl. No.: 139,625

[52] U.S. Cl. .................................. 144/3 D, 144/2 Z
[51] Int. Cl. ............................................. A01g 23/08
[58] Field of Search ....... 144/2 Z, 3 D, 34 R, 309 AC

[56] References Cited

UNITED STATES PATENTS

| 3,356,116 | 12/1967 | Brundell et al. | 144/3 D |
|---|---|---|---|
| 3,074,446 | 1/1963 | Earl | 144/2 Z |
| 3,294,131 | 12/1966 | Larson | 144/3 D |
| 3,498,350 | 3/1970 | Maradyn | 144/3 D |
| 3,529,643 | 9/1970 | Kamner | 144/2 Z |

FOREIGN PATENTS OR APPLICATIONS

| 247,696 | 11/1969 | U.S.S.R. | 144/3 D |

OTHER PUBLICATIONS

Publication: "Newsweek"; February 21, 1955; page 41.

Primary Examiner—Gerald A. Dost
Attorney—Teagno & Toddy

[57] ABSTRACT

A method and apparatus for harvesting trees includes provision for removing the limbs from a tree and cutting the delimbed tree into logs. The method and apparatus can operate on standing trees or felled trees. In the performance of the delimbing and cutting operation, the tree is gripped at one end with a gripper-shear mechanism. If the tree is standing, the shear cuts the tree at the base of the tree. In both operations, namely, where the apparatus is working on a standing or on a felled tree, a delimbing mechanism is moved along a first length of the tree to delimb that first length of the tree while the tree is supported by the gripper-shear mechanism and the delimbing mechanism. The gripper-shear mechanism is subsequently moved to a position adjacent to the delimbing mechanism so that the gripper-shear mechanism is positioned a predetermined length from one end of the tree. The gripper-shear mechanism is then actuated to cut the tree so that a log having a predetermined length is produced thereby.

9 Claims, 8 Drawing Figures

FIG. 1

INVENTOR
EMIL J. DAVID
BY Yount and Tarolli
ATTORNEYS

INVENTOR
EMIL J. DAVID
BY Yount and Tarolli
ATTORNEYS

INVENTOR
EMIL J. DAVID
BY 
ATTORNEYS

METHOD AND APPARATUS FOR HANDLING TREES

The present invention relates to a method and an apparatus for harvesting trees, and more particularly to a method and apparatus for harvesting trees which includes provision for removing limbs from the tree and cutting the delimbed tree into logs.

There are many known tree harvesters which are capable of felling and delimbing a tree. Other tree harvesters are capable of delimbing a felled tree and cutting the tree into a plurality of logs of a desired length. Still other tree harvesters are capable of felling, delimbing and cutting a tree into logs of a desired length. The known tree harvesters, particularly those which are capable of felling, delimbing and cutting a tree into logs of a desired length, are complex structures which during operation require substantial manipulation of the tree, as well as the mechanisms which effect the felling, delimbing and cutting operations. The present invention is directed to an apparatus and a method which provides for the felling, delimbing and cutting of a tree into logs of a desired length, and which method and apparatus are extremely simple and do not require substantial manipulation of the tree.

The apparatus of the present invention harvests trees by maneuvering the apparatus adjacent to the tree and gripping the tree at its base with a gripper shear mechanism. A gripper-delimbing mechanism is then moved along a first length of the tree to delimb the first length of the tree. While the gripper-delimbing mechanism moves along the tree, the gripper of the gripper shear mechanism securely grips the tree trunk and the gripper of the gripper-delimbing mechanism engages the tree trunk to further support the tree. The delimbing jaws of the delimber are urged toward each other so as the gripper-delimbing mechanism moves along the tree, the limbs are removed therefrom.

After at least a portion of the tree has been delimbed, the gripper-delimbing mechanism is operated to securely grip the tree. The gripper-shear mechanism is then released and moved to a position adjacent to the delimbing mechanism. When the gripper-shear mechanism is positioned adjacent to the delimbing mechanism and at a predetermined length from the end of the tree, the gripper-shear mechanism is activated to cut the tree so that a log having a predetermined length is produced thereby. These steps are repeated so as to produce a plurality of logs of a desired length from a tree. The structure is such that the delimbing mechanism and the gripper-shear mechanism are easily manipulated and moved relative to the tree and, thus, does not require a separate mechanism for moving the tree relative to either the delimber or gripper-shear mechanism.

Accordingly, it is an object of the present invention to provide a new and improved method and apparatus for felling a tree, removing the limbs from the tree, and cutting the delimbed tree into logs and which method and apparatus are simple and do not require substantial manipulation of the tree.

Another object of the present invention is to provide a new and improved method and apparatus for removing the limbs from a tree and cutting the delimbed tree into logs of a desired length and which does not require a separate mechanism for moving the tree relative to either the delimbing mechanism or the shear mechanism which cuts the tree into the desired lengths.

Still another object of the present invention is the provision of a new and improved method and apparatus for delimbing and cutting a tree into predetermined lengths wherein a delimbing mechanism and a gripper-shear mechanism move along the tree trunk in a stepwise fashion and effect the formation of logs of a predetermined length from the tree.

Yet another object of the present invention is to provide a new and improved method for removing the limbs from a tree and cutting the delimbed tree into logs and which includes the steps of gripping one end of a tree with a gripper-shear mechanism, moving a delimbing mechanism along a first length of the tree to delimb the first length of the tree while the tree is supported by the gripper-shear mechanism, moving the gripper-shear mechanism to a position adjacent to the delimbing mechanism so that the gripper-shear mechanism is positioned a predetermined length from one end of the tree, and cutting the tree with the gripper-shear mechanism so that a log having a predetermined length is produced thereby.

Further objects, advantages and features of the present invention will be apparent to those skilled in the art to which it relates from the following detailed description made with reference to the accompanying drawings forming a part of this specification and in which:

The present invention provides a new and improved method and apparatus for harvesting trees which provides for removing the limbs from a tree and cutting the delimbed tree into logs. The apparatus includes a gripper-shear mechanism which grips one end of the tree and a delimbing mechanism which moves along a first length of the tree after the gripper-shear mechanism has gripped the one end of the tree. The movement of the delimbing mechanism along the first length of the tree delimbs the first length of the tree while it is partially supported by the gripper-shear mechanism. The gripper-shear mechanism is subsequently moved to a position adjacent to the delimbing mechanism so that the gripper-shear mechanism is positioned a predetermined length from one end of the tree, whereupon the gripper-shear mechanism cuts the tree so that a log having a predetermined length is produced thereby.

Figure 1:
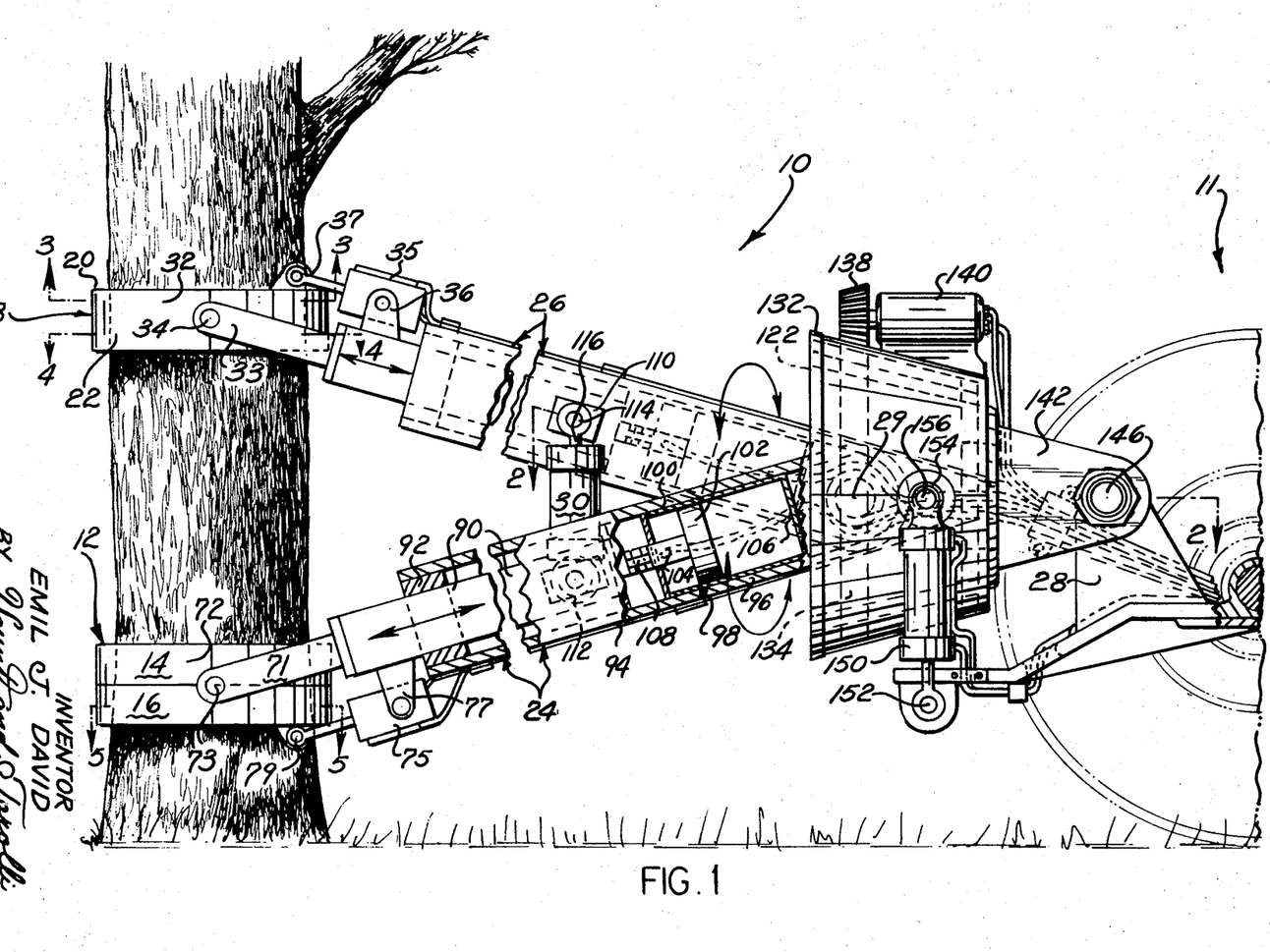
FIG. 1 is a side elevational view of a tree harvesting apparatus embodying the present invention.

The present invention may be embodied in apparatuses for harvesting trees of a wide variety of specific designs and for purposes of illustration is shown in FIG. 1 as embodied in a tree processing apparatus 10. The tree processing apparatus 10 is supported on a vehicle 11 which may be an articulated vehicle of any suitable construction. The vehicle 11 is mobile and can be moved from one standing tree to the next or among felled tree to process logs, as will be described hereinbelow, from either standing or felled trees.

The tree processing apparatus 10, as seen in FIG. 1, operates to remove the limbs from a tree and cut the delimbed tree into logs. In addition, the tree processing apparatus 10 is capable of felling a standing tree. The apparatus 10 includes a gripper-shear mechanism 12 which includes a tree-gripping mechanism, schematically shown at 14, and a tree-cutting or shear mechanism, schematically shown at 16. The apparatus 10 also includes a gripper-delimbing mechanism, generally indicated at 18. The gripper-delimbing mechanism 18 includes a delimber, schematically shown at 20, and a tree-gripping device, schematically shown at 22.

The mechanisms 12, 18 are mounted on first and second arms 24, 26, respectively. The arms 24, 26 are pivotally mounted for relative angular movement with respect to each other about a pivot axis 29. A fluid motor 30 is provided to pivot the arms 24, 26 relative to each other. The fluid motor 30 is operatively interconnected between the arms 24, 26 and upon energization in one direction causes the arms 24, 26 to move relatively apart while energization in the reverse direction causes the arms 24, 26 6o move relatively together. The fluid motor 30 is positioned as close to the pivot axis 29 of the arms 24, 26 as possible. By so positioning the fluid motor 30, a great amount of movement of the outer ends of the arms 24, 26 with respect to each other is effected by a small or short stroke of the fluid motor 30.

As noted, the apparatus 10 operates to fell a tree by activation of the shear mechanism 16. The apparatus 10 also removes the limbs from a tree and cuts the delimbed tree into logs. This is accomplished by gripping one end of the tree with the gripper 14. The delimbing mechanism 18 is then moved along a first length of the tree by activating the fluid motor 30. As the delimbing mechanism 18 moves, the delimber 20 delimbs the first length of the tree. After the delimber 20 has delimbed a first portion of the tree, the gripper 22 of the delimbing mechanism 18 is activated to securely hold the tree. While the tree is gripped by the gripper 22, the gripper 14 is deactivated and the fluid motor 30 is activated in the opposite direction so that the gripper-shear mechanism 12 moves to a position adjacent the delimbing mechanism 18 and is a predetermined length from one end of the tree. The gripper 14 of the gripper-shear mechanism 12 then is activated to grip the tree and the shear mechanism 16 is activated to cut the tree into a log having a predetermined length.

It should be understood that these steps may be repeated until the tree has been formed into a plurality of logs. It should also be understood that this sequence of steps may be repeated without accomplishing the step of cutting the tree with the shear mechanism 16 on each movement thereof along the tree so as to obtain a log having a greater length than the length which may be produced by cutting the tree on each movement of the shear mechanism 16.

The specific construction of the gripper-delimbing mechanism 18 does not form a part of this invention and may take different forms from that shown herein. For purposes of illustration, one specific form of the gripper-delimbing mechanism 18 is schematically shown in FIG. 1 and in greater detail in FIG. 3. The gripper-delimbing mechanism 18 has a frame member 32 which acts as a frame for mounting both the delimber 20 and gripping mechanism 22. The frame member 32 may be of any construction desired and is adapted to be pivotally mounted on a fork member 33 of the arm 26. The fork member 33 includes tongs which extend around the gripper-delimbing mechanism 18, and the frame member 32 is pivotally mounted to the fork member 33 by means of pivot pins 34 at diametrically opposite locations thereof. The fork member 33 is securely fastened to the arm 26 so that the pivot pins 34 and, consequently, the gripper-delimbing mechanism 18 move with the arm 26.

Figure 3:
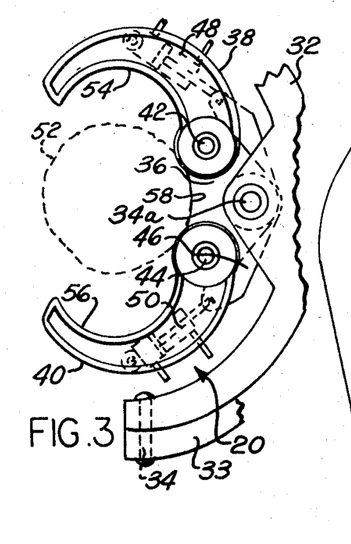
FIG. 3 is a partial sectional view of a portion of the delimbing mechanism embodied in the tree harvesting apparatus shown in FIG. 1 and taken along lines 3—3 thereof.

To control the angular position of the gripper-delimbing mechanism 18 about the pivot pins 34, a fluid cylinder 35 is provided. A self-adjusting mechanism of suitable construction using springs also could be used. The body of the cylinder 35 is pivotally secured to the arm 26 by means of the bracket 36, while the piston rod 37 is pivotally secured to an extension of the frame member 32. Thus, when the fluid cylinder 35 is actuated, the mechanism 18 rotates relative to the fork 33 about pivot pins 34 in a direction depending on the direction of movement of the piston rod 37. It should be understood that the actuation of the cylinder 35 is controlled by an operator in the vehicle by any conventional means well known to those skilled in the art.

The frame member 32 of the delimber 20 has a centrally located member 36 pivoted thereto by a pivot pin 34a. The member 36 has complementary delimbing arms 38, 40 pivotally secured thereto by their respective pivot pins 42, 44. Fluid cylinders 48, 50 for moving the delimbing arms 38, 40, respectively, are pivotally connected to an arm 46 at one end thereof and which arm 46 is pivotally mounted on the pin 34. At their other ends, the cylinders 48, 50 are connected to their respective delimbing arms 38, 40.

Figure 2:
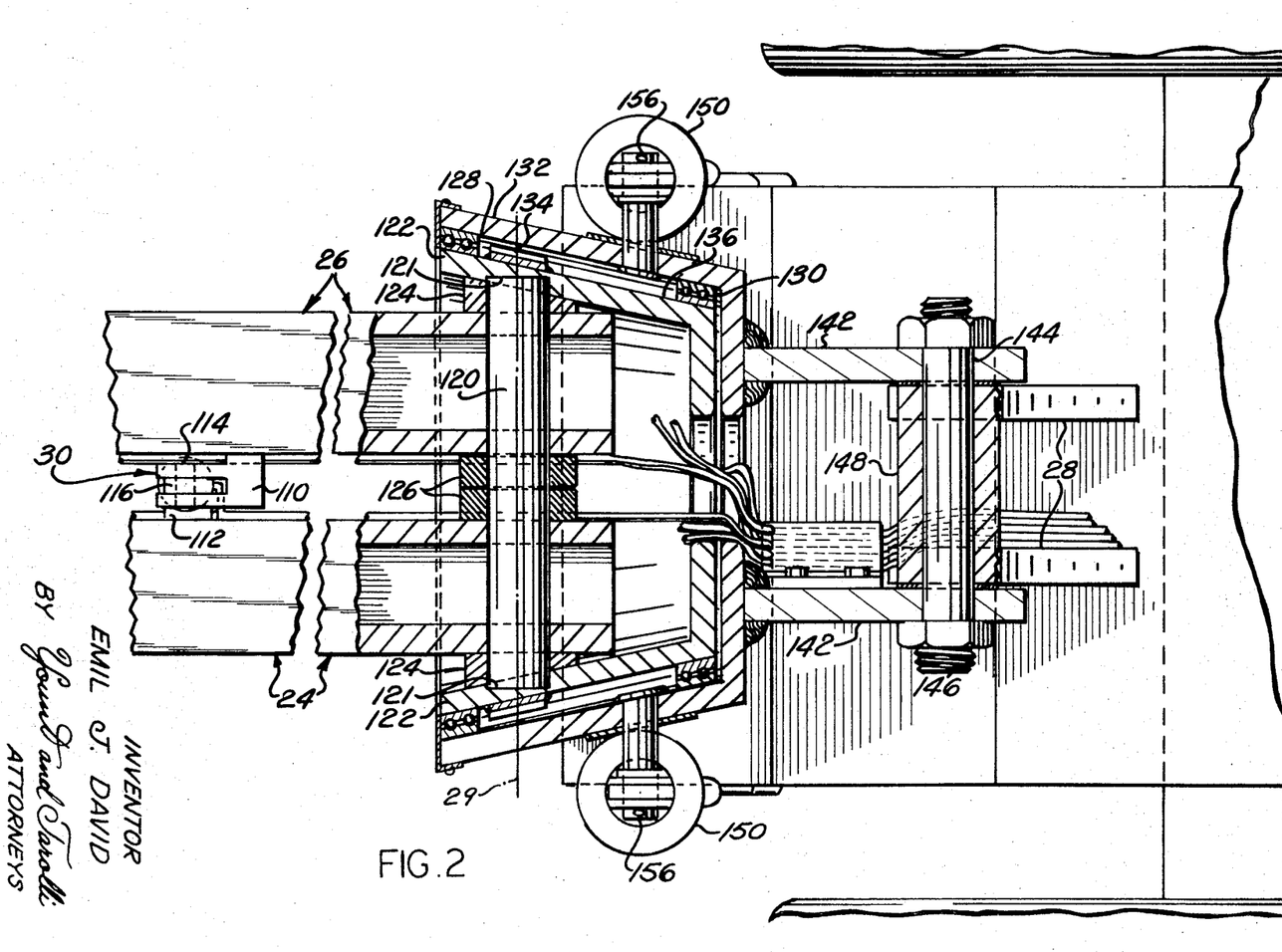
FIG. 2 is a fragmentary sectional view of the tree harvesting apparatus and taken approximately along the lines 2—2 of FIG. 1.

When the cylinders 48, 50 are actuated in one direction, the delimbing arms 38, 40 pivot about their respective pivot pins 42, 44 to an open position so that a tree, generally indicated at 52, may be received therebetween, as indicated in FIG. 2. In order to delimb the tree 52, the cylinders 48, 50 are activated in the other direction to provide a force to rotate the delimbing arms 38, 40 about their respective pivot pints 42, 44 into contact with the tree 52. When the delimbing mechanism 20 is moved along the tree 52, the leading edges 54, 56 of the delimbing arms 38, 40, respectively, and the leading edge 58 of the member 36 shear the limbs from the tree.

It should be understood that as the delimber 20 moves along the tree 52, the diameter of the tree 52 decreases and, therefore, the delimbing arms 38, 40 move toward each other so that the limbs extending from the tree 52 are severed therefrom close to the tree trunk throughout the entire length of the tree through which the delimber 20 moves.

Figure 4:
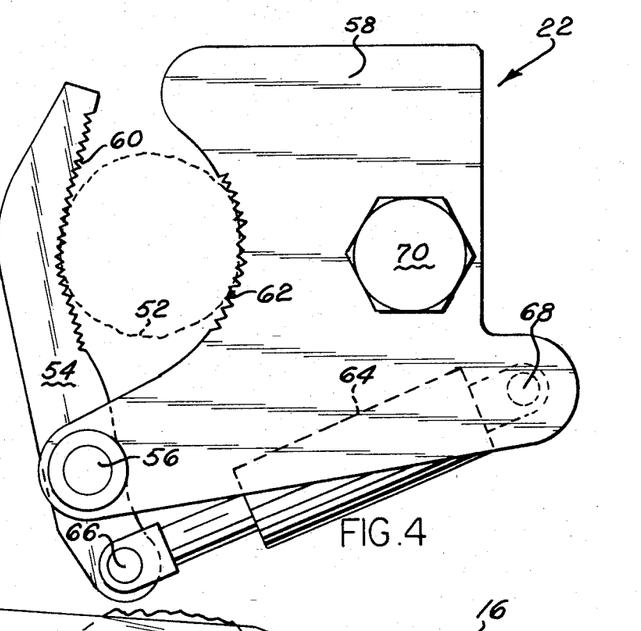
FIG. 4 is a partial sectional view of a gripping mechanism embodied in the tree harvesting apparatus of FIG. 1 and taken along lines 4—4 thereof.

The gripping device 22 of the delimbing mechanism 18 may comprise any mechanism capable of gripping and supporting a tree. For purposes of illustration, one form is shown in FIG. 4. It should be understood that the gripping device 22 and the gripping device 14 of the gripper-shear mechanism 12 may be similar in construction. For simplicity of description, only the gripping device 22 will be described in detail hereinafter.

The gripping device 22 includes a gripper jaw 54 pivotally connected by means of a pin 56 to a base member 58. A portion of the jaw 54 and a complementary portion of the base member 58 have serrated edges 60, 62, respectively, thereon for gripping the tree 52 and preventing movement of the tree 52 with respect to the gripper mechanism 22.

The gripper jaw 54 is rotated about the pin 56 by means of a fluid motor 64 which has one end pivotally connected to the jaw 54 by the pin 66. The other end of the fluid motor 64 is pivotally connected to the base member 58 by the pin 68. The base member 58 is provided with an opening 70 through which suitable fasteners may be inserted to pivotally connect the gripper 22 to the frame member 32 of the delimbing mechanism which, as noted above, is attached to the arm 26.

When the fluid motor 64 is actuated in one direction, the jaw 54 moves toward the base member 58 so that the tree 52 is clamped therebetween by engagement of the serrated faces 60, 62 with the tree 52. The fluid motor 64 exerts this gripping force regardless of the diameter of the tree by providing torque about the pin 56. When the fluid motor 64 is actuated in the other direction, the jaw member 54 moves in the opposite direction to thereby move the jaw 54 to an open position and remove the gripping force supplied by the gripper 22.

It should be understood that when the gripping force created by the fluid motor 64 is decreased, the gripper 22 may be moved along the length of the tree 52 to any desired position, and that when the gripping force is supplied to the gripper jaw 54, the jaw 52 will be supported by the gripping mechanism 22. It is apparent that the gripper 22 may provide support for the tree as the delimber 20 moves along a length of the tree. In such a case, a decreased gripping force is supplied to the gripper jaw 54 to allow the gripper to move along the tree while providing support to the tree.

The gripper shear mechanism 12 is mounted to the arm 24 in a manner similar to that above described in connection with the mounting of the gripper-delimbing mechanism 18 on the arm 26. The gripper-shear mechanism 12 includes a frame member 72 which is pivotally connected to the forked member 71 of the arm 24 by means of opposite diametrically located pivot pins 73, one of which is shown in FIG. 1. This method of connecting the gripper-shear mechanism 12 to the arm 24 allows for the angular adjustment of the gripper-shear mechanism 12 with respect to the arm 24.

To provide relative angular movement of the gripper shear mechanism 12 with respect to the arm 24, a fluid motor 75 is pivotally connected to the arm 24 by means of the bracket 77. The other end of the cylinder 75 is pivotally connected to an extension 79 of the frame 72 of the gripper-shear mechanism 12. When the fluid motor 75 is actuated in one direction, the gripper-shear mechanism 12 is rotated in one direction with respect to the arm 24, and when the fluid motor 75 is actuated in the other direction, the gripper-shear mechanism 12 is consequently rotated in the other direction. Thus, the gripper-shear mechanism 12 may be angularly positioned with respect to the tree to be processed.

As noted above, the gripper 14 of the gripper-shear mechanism 12 is of a construction similar to that of the gripper 22. However, the specific construction thereof could differ from that of gripper 22 and take different forms. It should be realized that the gripper 14 is secured to the frame member 72 of the gripper-shear mechanism 12 which is in turn connected to the arm 24.

Figure 5:
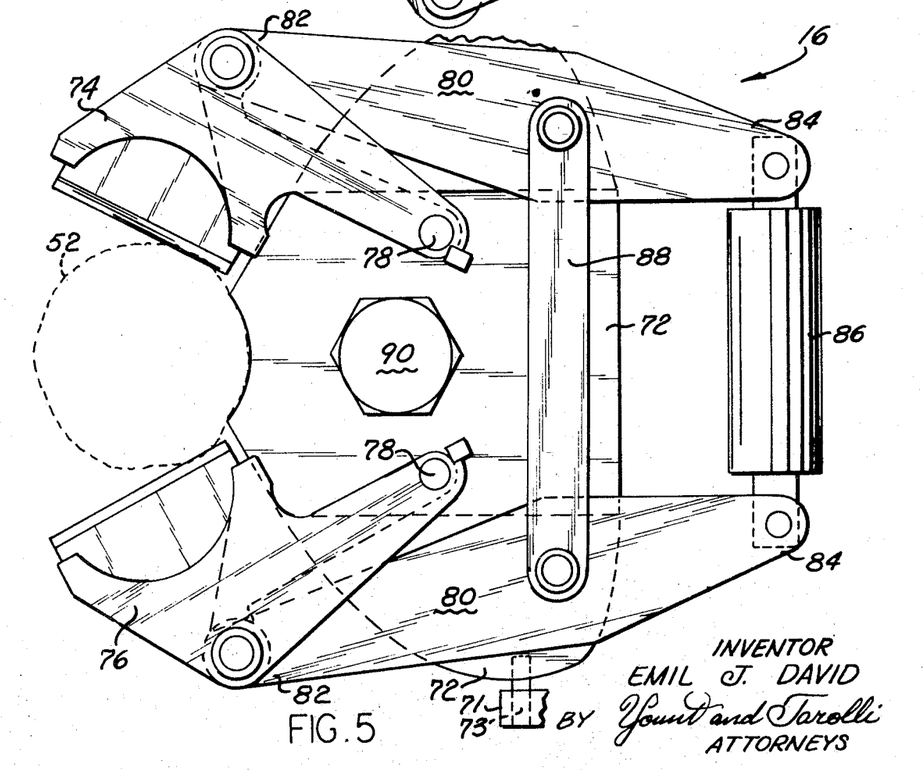
FIG. 5 is a view of a shear mechanism embodied in the apparatus of FIG. 1 and taken along lines 5—5 thereof.

The shear 16 of the gripper-shear mechanism 12 also may comprise any suitable mechanism for cutting a tree. For purposes of illustration, one specific design is shown in FIG. 5. As illustrated, the shear 16 includes a portion of the frame 72 to which complementary cutter blades 74, 76 are pivotally secured by means of the pins 78. In order to move the cutter blades 74, 76 from an open position, as shown in FIG. 5, to a closed position so that the tree 52 is cut thereby, the links 80 are pivotally attached at one end 82 to the cutter blades 74, 76 and at the other end 84 to a fluid motor 86. A tie rod 88 is pivotally connected to both of the links 80 so that when the fluid motor 86 is activated in one direction, the cutters 74, 76 move toward each other to sever the tree 52 and when the fluid motor 86 is actuated in the other direction, the cutter blades 74, 76 may move away from each other to an open position, as shown in FIG. 5.

It should be understood that when the cutter blades 74, 76 are in the open position, the shear mechanism 16 may be moved along the tree. In order to mount the shear 16 with the proper orientation relative to the gripper 14, the frame 72 includes an opening 90 therein which is complementary with the opening corresponding to the opening 70 of the gripper mechanism 14. Suitable fasteners may be utilized to extend through the opening 90 to secure the shear mechanism 16 to the gripper 14.

The mechanisms 12, 18 are moved relative to each other by the arms 24, 26, respectively. Each of the arms 24, 26 are constructed in a similar manner and, as such, only the arm 24 will be hereinafter described. The arm 24 includes the fork member 71 which pivotally supports the mechanism 12, as hereinabove described. The member 71 is connected to a movable boom section 90 in any conventional manner. The boom section 90 is supported by bearings 92, 94 which extend about the circumference of the boom 90. The bearings 92, 94 are supported by a base boom section 96. The bearings 92, 94 allow the boom section 90 to telescope relative to the boom section 96 to provide an arm 24 having a variable length.

To provide telescoping movement of the boom section 90 and thereby vary the length of the arm 24, a fluid motor device, generally indicated at 98, is provided. The fluid motor device 98 includes a cylinder 100 positioned inside of the boom section 96. A piston 102 is positioned inside of the cylinder 100 and is movable axially therealong. Fluid conduits 104, 106 are in fluid communication with the opposite ends of the cylinder 100. The piston 102 is connected to the boom section 90 by means of the member 108. When pressurized fluid is supplied to the opening 106, the boom section 90 moves outwardly relative to boom section 96. When pressurized fluid is provided through the conduit 104 into the cylinder 100, the piston 102 is moved in the opposite direction to thereby move the boom section 90 in the opposite direction.

The controls for determining which conduit 104, 106 is provided with pressure, is controlled by the operator of the vehicle and may be varied by him so that the length of the arm 24 and, consequently, the position of the mechanism 12 is controlled thereby. Thus, it can be seen that the position and the length of the arm 24 is controlled by the operator of the vehicle to adjust for various slopes of the terrain and relative positions of the trees in the forest in which the apparatus of the present invention is operated. It should be understood that the arm 26 is similarly controlled by the operator so that the mechanism 18 may be moved toward and away from the vehicle 11, and that by proper adjustment of relative lengths of the arms 24, 26 the apparatus 10 may be used on many different terrains and may be adjusted to compensate for positions of various trees in the forest, as will be hereinafter described.

As noted above, the arms 24, 26 are relatively movable about pivot axis 29. In addition, the arms 24, 26 are bodily rotatable about an axis perpendicular to the axis 29. The fluid motor 30 which is provided to pivot the arms 24, 26 relative to each other about the axis 29, is operatively interconnected between the arms 24, 26 and upon energization in one direction causes the arms 24, 26 to move apart, while energization in the reverse direction causes the arms 24, 26 to move toward each other. The interconnection between the fluid motor 30 and the arms 24, 26 may be of any conventional construction and, as shown in FIGS. 1 and 2, includes a retaining member 110 connected to the arm 26 and a complementary retaining member 112 connected to the arm 24. The retaining member 110 has an opening for receiving a pin 114 therein which passes through an opening in the cylinder rod 116 of the fluid motor 30. The retaining member 112 is similarly connected to the body of the fluid motor 30.

The arms 24, 26 are supported by a pivot pin 120 having ends received in a recess 121 of an inner drum member 122. The axis of the pin 120 comprises the pivot axis 29. The arms 24, 26 have complementary openings for receiving the pin 120 therethrough. Spacers 124 are provided between the internal drum and the arms 24, 26, and spacers 126 are provided between the arms 24, 26. By so mounting the arms 24, 26, they may rotate relative to each other about the axis 29. It should be understood that the rotational axes of arms 24, 26 need not lie along the same axis.

The inner drum member 122 is rotatably mounted in an outer drum 132 by bearings 128, 130. The bearings 128, 130 allow the inner drum 122 to be rotated so that the arms 24, 26 may be rotated and, thus, a tree supported by the mechanisms 12, 18 may be moved between a horizontal and a vertical position.

To effect rotation of the inner drum 122, a ring gear 134 is secured to the exterior surface 136 of the inner drum 122. A complementary pinion gear 138, as seen in FIG. 1, drivingly engages the ring gear 134. The pinion gear 138 is driven by a motor 140 mounted on the outer drum 132, as seen in FIG. 1. Controls are provided so that the operator may actuate the motor 140 to rotate the internal drum 122 until the arms 24, 26 properly position the tree with respect to the ground. It should be understood that the motor 140 may operate in either direction so that the arms 24, 26 and, consequently, the tree held by the mechanisms 12, 18 may be rotated in either direction.

To adjust for the various slopes of the terrain, the outer drum 132 is pivotally mounted to a frame 28 secured to the main structure of the vehicle. Thus, when the tree to be harvested is in a valley and the vehicle 11 is positioned on one of the sides of the valley, the external drum 132 may be angularly rotated with respect to the frame 28, this rotation in combination with the adjustment of the length of the arms 24, 26 allows the tree in the valley to be harvested while the vehicle remains on the side of the valley.

The construction of the outer drum 132 includes mounting members 142 which allow for the pivotal attachment of the outer drum to the frame 28. The mounting members 142 are secured to the body of the outer drum by any conventional means well known to those skilled in the art, such as welding, as shown in FIG. 2. The mounting members 142 each have an opening 144 adapted to receive a threaded fastener 146 therethrough. The threaded fastener 146 also extends through a bearing member 148 supported by the frame 28 so that the external drum 132 may rotate with respect to the frame 28.

Suitable hydraulic cylinders 150 are provided to pivot the drum 132 about the frame 28. The hydraulic cylinders 150 are located on opposite sides of the drum 132. The rod portion 152 of each motor 150 is secured to the frame 28, as seen in FIG. 1. The cylinder portion 154 of each motor 150 is secured to a pin 156 pivotally connected to the exterior of drum 132 in any manner well known to those skilled in the art. Thus, when the motors 150 are actuated in one direction, the drum 132 pivots in one direction with respect to the frame 28, and when the motors 150 are actuated in the other direction, the drum 132 pivots in the other direction. It should be understood that when the drum 132 is pivoted, the arms 24, 26 and their complementary associated mechanisms 12, 18 are likewise pivoted with respect to the frame 28.

The various mechanisms and hydraulic motors which have been described hereinabove are under the control of the operator of the vehicle and suitable hydraulic controls are provided for operating the various mechanisms. The specific controls and the hydraulic circuitry for operation of these controls are not described herein in detail in view of the fact that the specific controls and the hydraulic circuitry may take many different forms and do not form a part of the present invention.

The construction described hereinabove can be operated in many different ways in order to fell, delimb and cut a tree into logs of a predetermined length. As illustrated in FIG. 1, the mechanisms 12 and 18 are located relative to a standing tree so that the tree extends between the shear blades 74, 76 and between the delimbing arms 38, 40. The mechanisms are so positioned with the gripping mechanisms 14, 22 in a deactivated condition. The gripper mechanism 14 which is associated with the gripper-shear mechanism 12 is then actuated in order to grip the standing tree at its base.

To provide additional support of the tree, the gripper mechanism 22 of the gripper-delimber mechanism 18 is activated with a lower gripping force to support the tree, yet without gripping with such a great force as to prohibit movement of the gripper-delimber mechanism 18 along the tree. The delimber 20 is then actuated in a manner as hereinabove described, closing the delimbing arms 38, 40 around the tree, so that when the delimber 20 is moved with respect to the tree, the limbs extending from the tree will be removed therefrom.

Movement of the gripper-delimbing mechanism 18 with respect to the gripper-shear mechanism 12 is effected by actuation of the motor 30. The motor 30 effects movement of the gripper-delimbing mechanism 18 and the gripper-shear mechanism 12 in opposite directions away from each other. The gripper-delimbing mechanism 18 is thereby moved along the tree to delimb the portion of the tree along which it is moved. It should be understood that when such relative movement between the mechanisms 23 and 18 is effected, the relative length of the arms 24, 26 may be varied to accommodate any specific terrain problems or obstacles encountered, as will be hereinafter described.

The shear mechanism 16 is then actuated to sever the tree relatively close to the ground. When the tree has been so severed, the motor 140 is activated to rotate the arms 24, 26 and, consequently, the tree from a standing or vertical position to a horizontal position, such as is shown schematically in FIG. 6.

Figure 6:
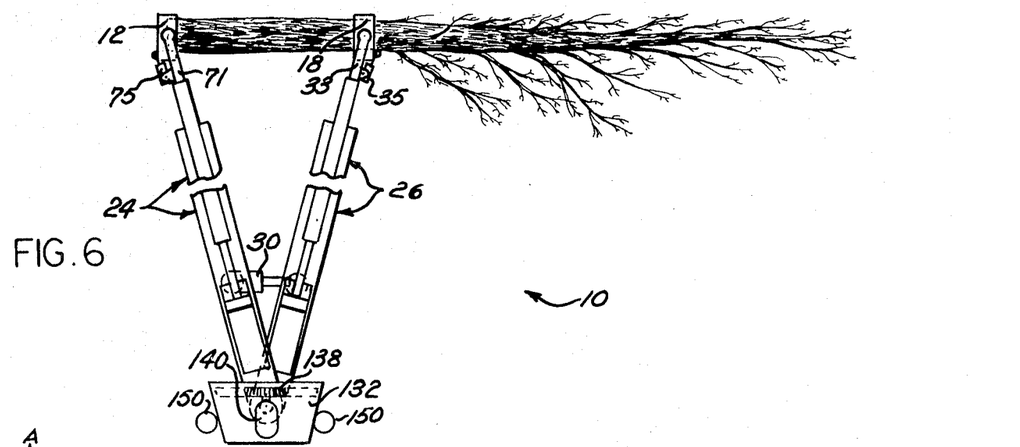
FIGS. 6–8 are schematic views illustrating the different positions of parts of the apparatus during operation thereof.

Once the delimbing mechanism is moved along the predetermined length of the tree, as shown in FIG. 6, the gripping device 22 of the gripper-delimbing mechanism 18 is actuated to grip the tree, and the gripping force of the gripper device 14 associated with the gripper-shear unit 12 is substantially decreased.

Figures 7, 8:
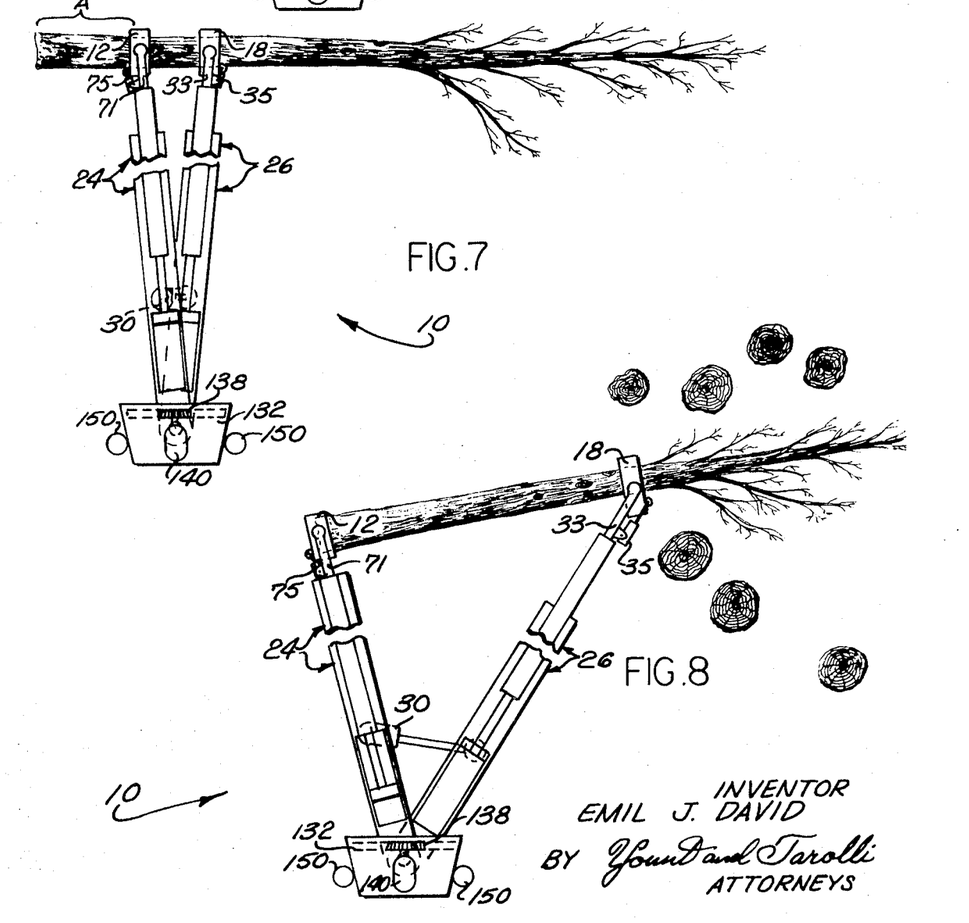

The motor 30 is then energized to move the gripper-shear unit 12 and the delimbing mechanism 18 toward each other so that the gripper-shear unit 12 moves along the tree in a direction toward the delimbing mechanism. In view of the fact that the gripper of the delimbing mechanism 18 is gripping the tree, the tree is moved in a direction opposite the direction in which the gripper-shear unit 12 moves. As a result of such relative movement, the gripper-shear unit 12 and the gripper-delimbing mechanism 18 take a position adjacent to each other, as shown in FIG. 7. The shear mechanism 16 is then actuated to cut a log of a predetermined length from the tree, as shown by the letter "A" in FIG. 7.

After one log of a predetermined length has been cut from the tree, the gripper mechanism 14 associated with the shear mechanism 16 may be actuated to grip the tree, and the force of the gripping mechanism 22 associated with the delimbing mechanism 20 may be decreased to allow the delimbing mechanism 20 to be moved along the tree. To provide such movement, the motor 30 is again energized to move the delimbing mechanism 18 along the tree and in the manner described above. The steps of gripping, delimbing and shearing, as described, can be repeated sequentially in order to form a plurality of logs from a tree.

It should be understood that the operational sequence of the mechanism may be repeated to produce a number of logs from a tree. It should also be understood that the mechanism 16 may also harvest a standing tree by other methods, and different operational sequential actions could be followed.

Before the harvesting operation begins in some cases, the position of the vehicle 11 must be adjusted with respect to the tree. The vehicle 11 is movable to position the mechanism 10 with respect to a standing tree so that the tree may be harvested. It is also movable to allow a felled tree to be harvested. In some cases, the relative positions of the mechanisms 12, 18 of the apparatus 10 must also be adjusted. The angular positions of the mechanisms 12, 18 with respect to their arms 24, 26 on which they are pivotally mounted must be pivotally adjusted to the position of the tree before the tree may be harvested. To accomplish such pivotal adjustment, the motors 75, 35 connected to the arms 24, 26 are activated in either direction to pivot the respective mechanisms 12, 18 about their respective pins 73, 74 so that they are properly positioned with respect to the trees.

It should also be understood that the length of each of the arms 24, 26 may be adjusted by the operator to properly position the relative lateral positions of the mechanisms 12, 18, as hereinabove described in connection with the motor 98. One example of such a desirable adjustment exists when a tree is located in a valley and the vehicle 11 is located on an incline. In order to harvest such a tree in the valley, the length of the arm 24 must be increased relative to the length of the arm 26. This allows the standing tree, which is actually at an angle with respect to the vehicle, to be harvested. The angular position of the mechanisms 12, 18 must be adjusted with respect to each other as hereinabove described so that they accommodate the tree.

The adjustable length of the arms 24, 26 may also be utilized when a tree is being harvested in the woods where a number of other trees are located and it is desirable to avoid contact of the tree being harvested with the other trees in the forest. As shown in FIG. 8, the arm 26 may be increased in length relative to the length of the arm 24 so that the tree being harvested is at an angular position with respect to the vehicle 11. As the tree is harvested by the mechanism 10, the relative length of the arms 24, 26 may be adjusted in a manner as hereinabove described so that the tree being harvested remains out of contact with the surrounding tress in the forest.

In certain instances the trees to be harvested by the apparatus 10 may have already been felled and are in a horizontal position lying on the ground. The apparatus 10 of the present invention is operable to delimb and cut felled trees into logs. Such a harvesting operation includes positioning the arms 24, 26 in a horizontal position so that the mechanisms 12, 18 may cooperatively engage a tree lying on the ground. The motor 150 is activated to lower the arms 24, 28 so their corresponding mechanisms 12, 18 may engage the tree to be harvested. By adjusting the angular position of the mechanisms 12, 18 with respect to their respective arms 24, 26 by means of the motors 75, 35, the mechanisms 18, 12 are positioned about the tree to be harvested. The grippers 14, 22 are then activated and the tree is raised by activating the motor 150 to move the arms 24, 26 in an upward direction. The device 10 is then sequentially operated, as hereinabove described, to harvest the tree.

While the operation described above results in a shearing of the tree after each indexing step of the gripper-shear mechanism 12 along the tree, it should be apparent that the shearing step can be eliminated and that logs of a length equal to the distance moved in multiple steps by the gripper-shear mechanism 12 may be provided by actuating the shear mechanism 16 either after every other step or only after a predetermined number of steps along the tree. Moreover, it should be apparent that the apparatus could operate while the tree is positioned other than in the horizontal position, as illustrated in the drawings. Moreover, it should be apparent that the mechanism can also operate to cut and delimb trees where the trees have already been felled, thus making the apparatus operable to delimb and cut trees into logs of a predetermined length, as well as to fell trees and then cut the trees into logs of a predetermined length.

What is claimed is:

1. An apparatus for removing the limbs from a tree and cutting the delimbed tree into at least one log comprising a gripper-shear mechanism for gripping one end of the tree, a first arm supporting said gripper-shear mechanism, a delimbing mechanism, a second arm supporting said delimbing mechanism, means acting between said arms for moving said delimbing mechanism along a first length of the tree to delimb the first length of the tree while the tree is supported by the said gripper-shear mechanism, and for moving said gripper-shear mechanism to a position adjacent to said delimbing mechanism after said delimbing mechanism has delimbed the first length of the tree so that the gripper-shear mechanism is positioned a predetermined distance from the one end of the tree, means operatively associated with said gripper-shear mechanism for cutting the tree to form a log of a predetermined length, rotatable means mounting said first and second arms for pivotal movement about mutually parallel axes, and means mounting said rotatable means for pivotal movement about a fixed substantially horizontal axis perpendicular to its axis of rotation.

2. An apparatus for removing the limbs from a tree and cutting the delimbed tree into at least one log as defined in claim 1 wherein said delimbing mechanism includes means for delimbing a tree and gripping means for holding and supporting the tree, and means for actuating said gripper means to grip the tree when the tree is released by the gripper-shear mechanism.

3. An apparatus for removing the limbs from a tree and cutting the delimbed tree into at least one log as defined in claim 1 wherein said means for cutting the tree to form a log is positionable to fell a standing tree.

4. An apparatus for removing the limbs from a tree and cutting the delimbed tree into at least one log as defined in claim 1 which includes means for changing the relative lengths of said first and second arms.

5. An apparatus for removing the limbs from a tree and cutting the delimbed tree into at least one log as defined in claim 1, in which said means for moving said gripper-shear mechanism and said delimbing mechanism includes a fluid motor connected between said first arm and said second arm for effecting relative pivotal movement therebetween.

6. An apparatus for removing the limbs from a tree and cutting the delimbed tree into at least one log as defined in claim 1, including a rotary power means for rotating said rotatable mounting means about its axis.

7. An apparatus for removing the limbs from a tree and cutting the delimbed tree into at least one log as defined in claim 1, in which the pivotal axes of said first and second arms are perpendicular to the axis of rotation of said rotatable mounting means.

8. An apparatus for removing the limbs from a tree and cutting the delimbed tree into at least one log as defined in claim 1, including power means for effecting pivotal movement of said rotatable mounting means.

9. An apparatus for removing the limbs from a tree and cutting the delimbed tree into at least one log as defined in claim 1, including first power means acting between said first arm and said gripper-shear mechanism and second power means acting between said second arm and said delimbing mechanism, said first and second power means being effective to selectively change the attitude of said gripper shear and delimbing mechanisms relative to one another and to their respective supporting arms.

* * * * *